R. R. STABLER.
AUTOMOBILE LOCK.
APPLICATION FILED SEPT. 15, 1919.

1,363,373.

Patented Dec. 28, 1920.
2 SHEETS—SHEET 1.

WITNESSES
J. P. Schrott

INVENTOR
Robinson R. Stabler
BY
ATTORNEYS

R. R. STABLER.
AUTOMOBILE LOCK.
APPLICATION FILED SEPT. 15, 1919.
1,363,373.
Patented Dec. 28, 1920.
2 SHEETS—SHEET 2.
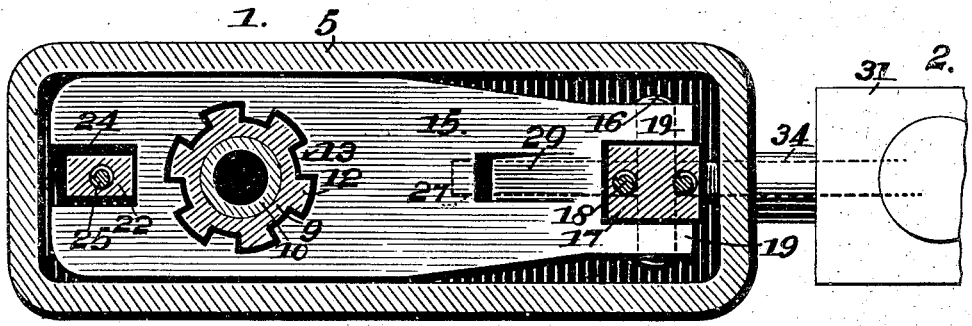
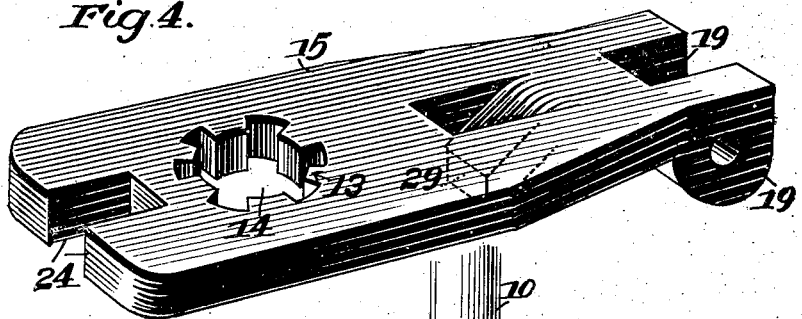
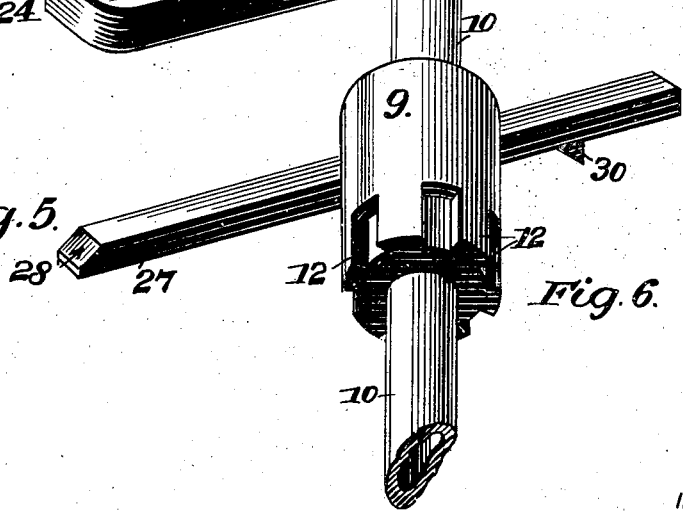
WITNESSES
J. P. Schrott
INVENTOR
Robinson R. Stabler
BY
ATTORNEYS

UNITED STATES PATENT OFFICE.

ROBINSON RYLAND STABLER, OF BALTIMORE, MARYLAND.

AUTOMOBILE-LOCK.

1,363,373.     Specification of Letters Patent.     Patented Dec. 28, 1920.

Application filed September 15, 1919. Serial No. 323,853.

*To all whom it may concern:*

Be it known that I, ROBINSON R. STABLER, a citizen of the United States, and a resident of Baltimore, in the State of Maryland, have invented certain new and useful Improvements in Automobile-Locks, of which the following is a specification.

My invention relates to improvements in automobile locks, it being more particularly an improvement in locks for steering wheel shafts, and it consists in the constructions, combinations and arrangements herein described and claimed.

The foremost object of my invention is to provide an automobile lock that is operatively combined with the ignition circuit in such a way that the ignition circuit is broken as the lock is moved to the locked position.

A further object of the invention is to provide a lock as described, which is so arranged that the operatively associated ignition circuit cannot be broken until the lock goes into place.

A further object of the invention is to provide an automobile lock by the use of which the possibility of leaving the automobile unlocked is far removed, because the operator in breaking the ignition circuit, which he invariably does from force of habit, automatically moves the lock into the operative position.

A further object of the invention is to provide an automobile lock by means of which the steering shaft of the automobile can be locked in any desired position.

A further and important object of the invention is to provide a combined automobile lock and ignition circuit control, in which it is impossible to accidentally lock the steering shaft and still be able to proceed with the automobile, because the act of locking the steering shaft automatically breaks the ignition circuit so that the engine stops.

Other objects and advantages will appear in the following specification, reference being had to the accompanying drawings, in which—

Figure 1:
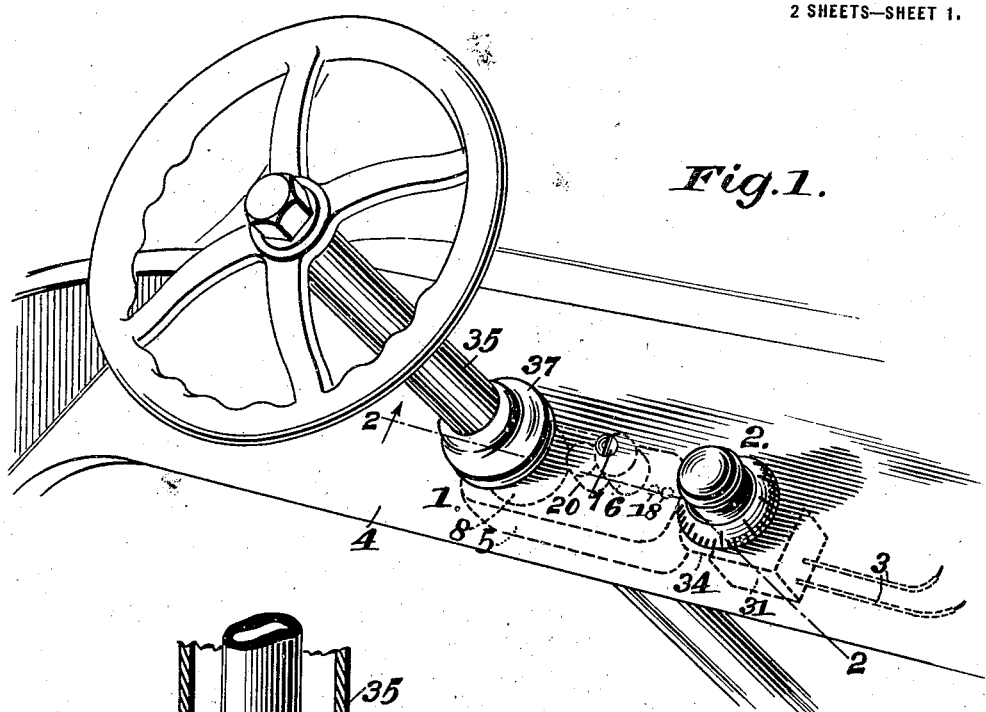
Figure 2:
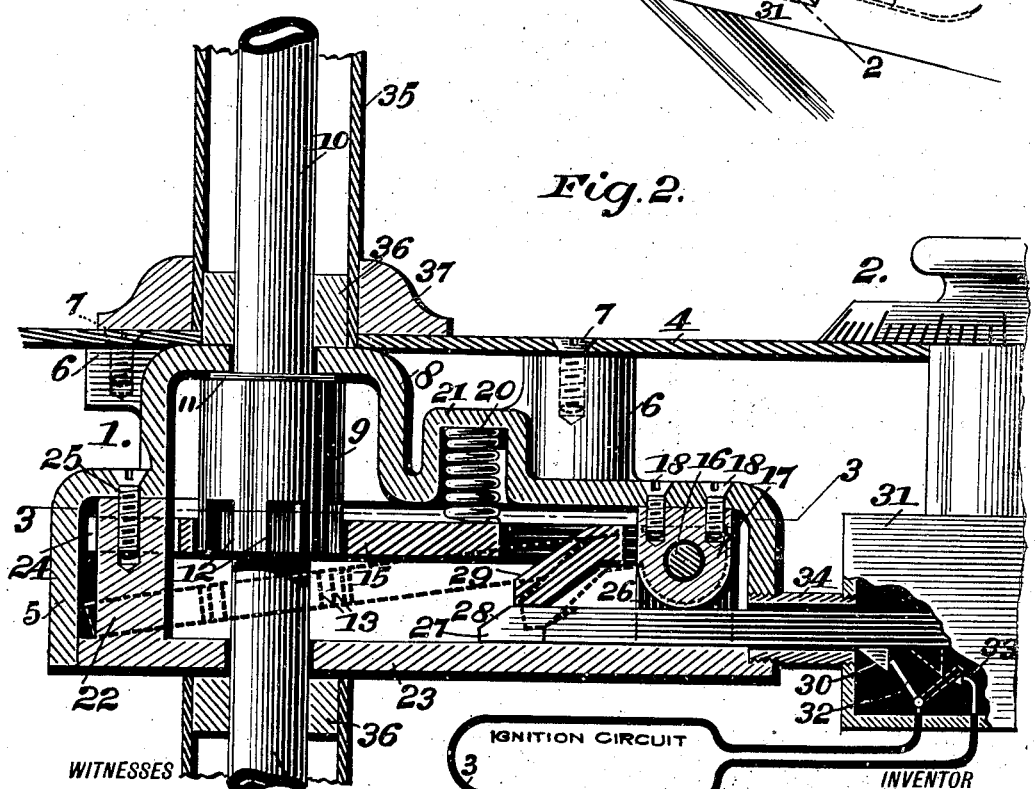

Figure 1 is a perspective view of enough of the instrument board to illustrate the position of the improved lock, Fig. 2 is a longitudinal section taken substantially on the line 2—2 of Fig. 1, showing the locked position in full lines and the unlocked position in dotted lines, Fig. 3 is a horizontal section taken substantially on the line 3—3 of Fig. 2, Fig. 4 is a detail perspective view of the pivoted lock plate, Fig. 5 is a detail perspective view of the lock bolt and Fig. 6 is a detail perspective view of the lock sleeve fixed on the steering shaft.

In its general aspect, the improved automobile lock comprises the combination of the lock 1 proper, the combination lock 2 and the ignition circuit 3. The combination lock 2, which is the only part visible on the instrument board 4, is manipulated to simultaneously unlock the lock 1 and close the ignition circuit 3, and conversely to lock the lock 1 and open the ignition circuit, as appears more fully below.

In construction, the lock 1 comprises a casing 5 which is provided with any suitable means such as lugs 6, through which it is attached to the back of the instrument board 4 as at 7. A dome 8 accommodates the lock sleeve 9 which is fixedly secured to the steering shaft 10 by sweating, applying set screws or other means, so that the sleeve must turn with the shaft 10. A washer 11, of which others may be added if necessary, is interposed between the sleeve 9 and the top of the dome 8.

Formed on the lower periphery of the sleeve 9 is an annular series of serrations or teeth of any suitable shape 12. With these the teeth 13, of like formation, in the lock seat or aperture 14 in the lock plate 15 coöperate. This lock plate is pivoted at 16 to a fastening lug 17 which is secured at 18 to the roof of the casing 5. Suitably formed pivot lugs 19 at the right end of the plate 15, face the lug 17 on the sides as shown.

Gravity is assisted in moving the pivoted lock plate 15 to the dotted line unlocked position in Fig. 2, by a spring 20 which bears on top of the plate and is located in the housing 21 on the casing 5. A guide lug 22, extending inwardly from the front closure plate 23, fits in the bifurcated end 24 of the lock plate 15, and serves to keep the lock plate in the true position with respect to the sleeve 9. A screw 25, or equivalent means, is fitted into the lug 22 to hold the closure plate in place, the complementary securing means for the closure plate being the fastening lug 17 referred to above.

Both of these lugs, namely 17 and 22, arise from the closure plate 23 and are secured to the roof of the casing. A guide slot 26 in the lug 17 makes room for the bolt 27, which is beveled at 28 so as to more easily ride under the projection 29 of the lock plate 15, when the combination lock 2 is manipulated to move the bolt 27 inwardly.

A wedge, or other shaped switch lug 30, on the bolt 27 but located in the combination lock housing 31, actuates any suitable ignition switch 32, so that the companion contact 33 is engaged or disengaged according to the position of the bolt 27. Any suitable ignition circuit 3 is connected respectively to the points 32, 33.

Any desired construction may be adopted for the combination of the casings 1 and 31. In Fig. 2, the construction, which is subject to considerable modification, includes the use of a connecting sleeve 34 through which the bolt 27 extends into the respective casings. The steering post 35, which houses the steering shaft 10, is arranged in any suitable way according to common practice, including certain bushings 36 and a clamp or face plate 37, substantially as shown in Fig. 2.

*The operation.*

Normally the lock plate 15 reclines in the dotted line position in Fig. 2, being urged to that position partly by the action of gravity but principally by the effort of the spring 20. When in this position, the teeth 13 of the lock seat 14 in the plate 15, are free of the teeth 12 on the lock sleeve 9, so that as a result the steering shaft 10 is easily turned in either direction.

At this same position of the parts of the lock, the bolt 27 is in the retracted position, indicated in dotted lines, so that the switch 32 engages the contact 33 and the ignition circuit 3 is closed. The engine is now running and the steering shaft 10 is freely turned.

On leaving the automobile, the operator must give the knob of the combination lock 2 a twirl, because no other means is provided for breaking the ignition circuit 3. In thus turning the ignition circuit off, the properly arranged mechanism of the combination lock 2 operates to move the bolt 27 inwardly, thereby lifting the lock plate 15 so that the teeth 13 and 12, rsepectively in the plate and sleeve 9, mesh. Should it be so that the respective teeth are a little out of alinement, all the operator needs to do is to work the steering wheel until he feels the teeth are in alinement, whereupon it becomes possible to give the knob of the combination lock 2 the twirl referred to.

*The advantages* of this improved lock are numerous and are here stated so as to aid in the comprehension of the utility of the device. The operator enters the car, comfortably takes his seat and works the combination of the lock 2 so as to close the ignition circuit and unlock the lock. He does not have to remove his gloves to hunt for an ofttimes misplaced key, which is a pursuit of no little annoyance at times.

There is of course no chance for the operator to lose either a lock or switch key, because neither is here employed. Obviously the machine can be left anywhere and the possibility of unauthorized removal is very remote. Even should a thief succeed by some ingenuity in grounding or closing the ignition circuit, the steering shaft would still be locked in either a straight ahead or turning position. If the machine cannot be controlled by guiding, difficulties will soon be encountered so that the removal of the machine does the thief very little good.

It is a fact that perhaps requires no repetition, that this lock is "fool-proof," in that the operation of the lock depends on the actuation of the ignition switch, and vice versa. The operator cannot cut off the engine, to use a common expression, unless he locks his steering shaft. The wheels can be locked in any position even in a rut.

While the construction and arrangement of the improved automobile lock as herein described and claimed is that of a generally preferred form, obviously modifications and changes can be made without departing from the spirit of the invention or the scope of the claims.

I claim:

1. The combination, of an ignition circuit with closure means, a movable steering mechanism part with engageable means, a normally free reclining pivoted lock plate to engage said means, and controlling means for all, including a combination lock with associated means necessitating the opening of said closure means before the lock plate can be moved on its pivot to the locking position by manipulation of the combination lock.

2. An automobile lock, comprising a concealed supported casing, with a movable steering mechanism part running therethrough and carrying engageable means in the casing; spring pressed normally inoperative lock means with engaging means, pivoted in the casing; an electric switch, and an instrument board-accessible combination lock with a movable controlling member for simultaneously opening the switch and moving the lock means into engagement, and vice versa.

3. An automobile lock, comprising a casing with means for securing it in a concealed position, a movable steering mechanism part extending therethrough, with a carried toothed lock sleeve, spring pressed lock means pivoted in the casing with means to interlock with the teeth of said sleeve, an electric switch and combined means for controlling said switch and said lock, including a combination lock with a movable bolt for opening the switch and rocking the lock means to the interlocking position.

4. An automobile lock, comprising a dual-domed casing with attaching lugs, a dome-opposed closure with securing lugs of which one is a pivot mounting and guide, a trans-extending movable steering mechanism part with a carried toothed lock sleeve in one dome, a lock plate pivoted on one securing lug, provided with a projection, bifurcated to straddle the other securing lug for guidance and having a toothed opening for engaging the sleeve; a spring in the other dome pressing the plate to an inoperative position, a bolt, guided in the aforesaid securing lug and beveled ended for ease of raising said projection; and a connected combination lock casing housing the bolt, including an ignition switch controlled by the bolt as it rocks the lock plate.

5. The combination in an automobile lock, of a revoluble steering shaft with a toothed sleeve, complementary-toothed lock means operative toward and from the sleeve, means normally positioning said means in the inoperative position, and a transversely movable member operative at right angles to the sleeve to rock said lock means into the operative position.

6. An automobile lock, including a casing, a steering mechanism carried movable toothed lock sleeve located in the casing, complementary-toothed lock means pivoted in the casing and movable toward and from said lock sleeve, and means on a part of the casing for keeping said lock means in true position in respect to the sleeve in said movements.

7. An automobile lock, including a casing with a guide lug, a steering shaft passing therethrough, with a toothed sleeve in the casing; a lock plate bifurcated at one end to straddle the guide lug, with an adjacent toothed aperture kept in true position with said sleeve by said lug; pivot lugs in the casing supporting the other end of said plate, a projection on the under side of said plate, means operative against said projection, and resilient means resisting the movement of the lock plate when said operative means urges the plate to a locking position against the sleeve.

8. An automobile lock, including a casing, a closure plate therefor with a pair of lugs extending to the roof of the casing for attachment, lock means pivoted on one lug and guided in its movement by the other lug, and means for actuating said lock means, guided by the first lug.

9. A lock, comprising a casing, with a movable steering mechanism part running therethrough, and carrying engageable means in the casing; pivoted lock means with engaging means pivoted in the casing; resilient means normally holding the engaging means inoperative to resist accidental locking, an electric switch, and combined means for controlling the lock means and switch, including a lock with movable means for rocking said pivoted lock means to the engaging position against the tension of the resilient means, and opening the switch.

10. A lock, comprising a combination lock, with means movable by the spindle; pivoted locking means with gripping means, in connection with said movable means to be actuated thereby; a movable steering mechanism part with engageable means, an electric switch, opened when the locking means is actuated by the movable means, to grip the engageable means and vice versa; and resilient means in association with the pivoted locking means to resist said gripping action.

ROBINSON RYLAND STABLER.